Feb. 8, 1927. G. C. FUNK ET AL Re. 16,543

SKATING RINK FLOOR

Original Filed May 18, 1921 2 Sheets-Sheet 1

INVENTORS
George C. Funk
Magnus J. Palson
BY
Philip S. McLean
ATTORNEY

Feb. 8, 1927. G. C. FUNK ET AL Re. 16,543

SKATING RINK FLOOR

Original Filed May 18, 1921 2 Sheets-Sheet 2

INVENTORS
George C. Funk
Magnus J. Palson
BY
Philip S. McLean
ATTORNEY

Reissued Feb. 8, 1927. Re. 16,543

UNITED STATES PATENT OFFICE.

GEORGE C. FUNK, OF BROOKLINE, AND MAGNUS J. PALSON, DECEASED, LATE OF GLOUCESTER, MASSACHUSETTS; BY GEORGE C. FUNK, JOINT INVENTOR AND ASSIGNEE OF MAGNUS J. PALSON.

SKATING-RINK FLOOR.

Original No. 1,507,592, dated September 9, 1924, Serial No. 470,676, filed May 18, 1921. Application for reissue filed July 27, 1926. Serial No. 125,381.

This invention relates to improvements in floors of buildings, especially for buildings to be used as skating rinks.

The object of the invention is to construct a floor with a wearing surface in a building, which is so combined with a refrigerating system that an ice surface can be formed on top of the floor and used as an ice skating surface and also so constructed that the ice surface may be removed from the floor so that it can be used as an ordinary wearing floor.

It is further the object of this invention to so construct the floor that an ice surface can be frozen thereon in a minimum time, namely, a few hours and likewise removed in a few hours, making it unnecessary to devote the building exclusively to the use of a skating rink. This invention makes it possible to utilize the building from day to day either for skating or for other purposes with or without the ice on the floor. To accomplish these results refrigerating pipes are embedded in the floor.

The invention contemplates using either a freezing mixture in the pipes for the purpose of lowering the temperature of the floor to freeze water on the surface of the floor and to produce ice, or the pipes in the floor may be supplied with heated fluid, whereby the floor becomes heated and thus heats the building in which the floor is located.

Heretofore skating rink floors have had ice frozen on the surface thereof by pipes located above the floor. This necessitated the removing or placing in position of the refrigerating piping on a large floor for a skating rink and this operation required at least one to two weeks, involving a great expense for labor and was also very destructive to the piping besides requiring a building for storage of the piping when not in use. The length of time necessary to freeze an ice surface according to this old method of rink floor construction was three days and nights for a minimum and in some cases a week or twelve days and a similar length of time was required to remove the ice and pipes, making it impracticable to use the building for any other purpose during the skating season.

By this improved construction, a floor provided with the refrigerating and heating system hereinafter described can be used to freeze ice on the floor and also be used to radiate heat for the warming of the building, and the freezing of the ice and removing of the same takes so little time that the building can be used one night as a skating rink and the next night as a lecture hall or dance hall, or for any other purpose for which the usual floor is desired, thus making a practical and profitable construction.

This invention further contemplates the provision of an automatic system for removing all air from the pipes in the system and for removing and carrying away all snow scrapings caused by skating on the surface and also to furnish thoroughly dependable safeguards against breaking of pipes, fittings in mains, connections or floor pipes caused by expansion and contraction through a great range of temperature; to utilize the daily ice scrapings from the floors and the ice itself when removed, for the purpose of cooling the condensing water used in the plant.

The invention consists in the combination and arrangement of parts set forth in the following specification and particularly pointed out in the claims thereof.

Referring to the drawings.

Like numerals refer to like parts throughout the several views of the drawings.

Figure 1:
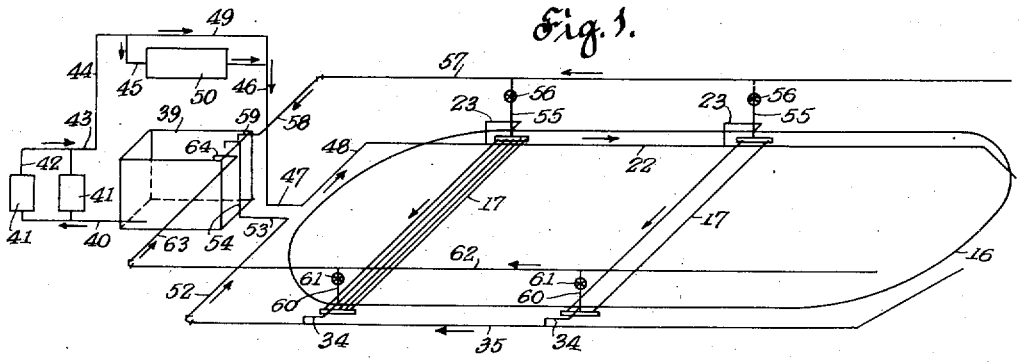
Figure 1 is a diagrammatic perspective view of the piping for the brine circulating system for cooling the floor and the piping for removing air from the said system.
Figure 2:
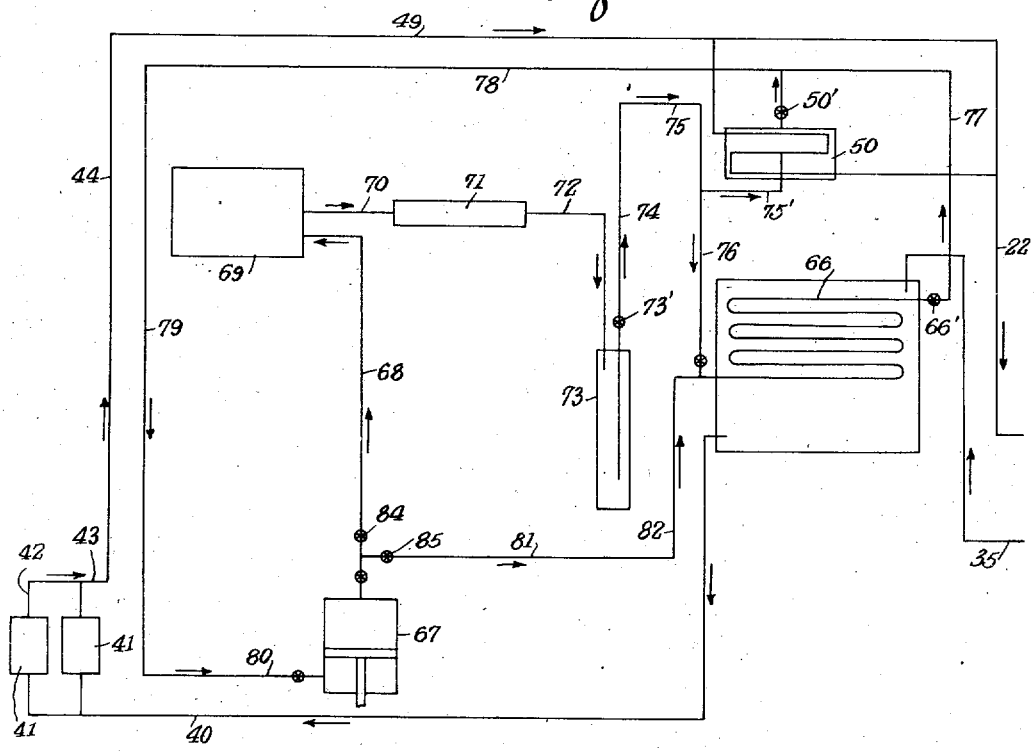
Figure 2 is a diagrammatic plan view illustrating the piping for the brine circulating system and also the piping whereby hot ammonia gas may be circulated through coils in the brine tank to raise the temperature of the brine instead of lowering it and thus heat the floor through which the brine supply pipes circulate.

In the drawings, 10 is a floor which consists of a layer 11 of pebbles, broken stones or very coarse gravel which is laid on the ground or any supported structural floor to a thickness of about six inches; then a layer 12 of selected and sifted light cinders of nearly even size; then a layer 13 of concrete one inch to an inch and a half thick. On the top of the concrete layer, strips of cork 14 are laid and the intervening spaces 15 are filled with alternate layers of dry sand and ground cork. In Figure 1 the line 16 indicates the oval shape of the skating rink floor and across this floor extends a large number of parallelly disposed brine circulating pipes 17. These pipes are preferably laid directly on said cork strips 14 and at their ends said circulating pipes are connected together by headers 18 and 19, the pipes being arranged to form a series of units preferably with eight of the brine circulating pipes in each unit. In laying the floor, when the pipes 17 have been thoroughly tested, a composite mixture consisting of concrete mixed with metallic shavings, scraps or any other material having a high conductivity is laid between and around the pipes in separate sections 20 with expansion joints 21, said expansion joints being preferably arranged one to correspond with each space between adjacent headers. This composite mixture should be well tamped in between the pipes and smoothly finished on the surface, leaving a thickness of about three-quarters of an inch above the top of the pipes 17 to serve as a hard wearing surface. The composite mixture found most useful for a ready transmission of heat combined with strength and finish is as follows:—Two parts of iron shavings, two parts of clean sand or fine gravel, one part of cement or other material to set up the floor and a small quantity of water-proofing material.

The expansion joints 21 divide the floor up into spaces, each space containing a unit composed of a plurality of the brine circulating pipes, preferably eight, and two headers, thereby making it possible to remove one entire unit without disturbing any part of the composition floor between and above the rest of the coils of pipe 17. The expansion joints are formed by filling the spaces in which they are located with hot elastic asphalt.

The floor hereinbefore described will transmit heat very readily to the brine in the pipes, whereby a skating surface may be made in a few hours on the floor and in a similar time the ice so formed may be loosened from the floor and sufficiently thawed to be readily removed from the whole surface.

The brine is supplied to the pipes 17 and their headers by a brine main 22 which is connected to each of the headers 18 by a system of piping constituting a compensating or swing joint 23 consisting of a vertical pipe 24 which is connected by an elbow 25 to a horizontal pipe 26 in which is provided a valve 27 and which is connected to an elbow 28, horizontal pipe 29, elbow 30, horizontal pipe 31 and elbow 32 to a vertical pipe 33 which leads into the header 18. The header 19 is connected by a compensating or swing joint 34 similar to the compensating joint 23 to a return brine main 35. The water is held upon the floor preparatory to freezing, or after the ice has been melted, by a curb 36 extending entirely around the rink and approximately of the outline indicated by the line 16, Figure 1. The brine mains 22 and 35 are located in trenches 37 and 38 respectively.

Figure 4:
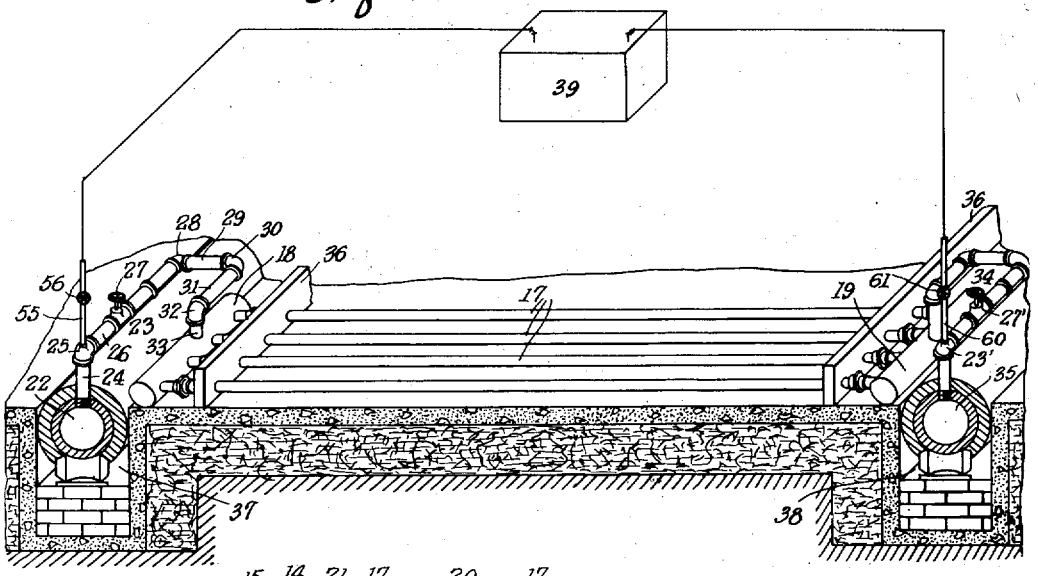
Figure 4 is an enlarged perspective view illustrating the construction of the floor and of a portion of the piping.
Figure 5:
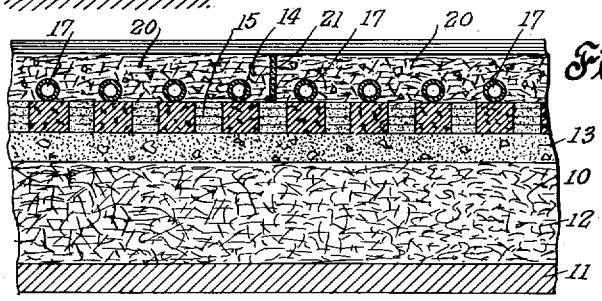
Figure 5 is an enlarged section of the floor taken transversely of the brine circulating pipes and broken away.

Referring now to Figure 1, the brine supply main 22 is supplied with brine from a brine tank 39 which contains a brine solution which runs by gravity through a pipe 40 to pumps 41 and from said pumps the brine is forced through pipes 42, 43, 44, 45, brine cooler 50 and pipes 46, 47 and 48 to the brine main supply 22, or if desired, instead of passing directly through the cooler 50 to the pipe 46, it may be by-passed through the pipe 49 to the pipe 46. The brine is carried through the main 35 and through pipes 52, 53 and 54 and returned to the brine tank 39. In order to remove the air from the brine mains, vertically extending pipes 55, Figures 1 and 4, provided with valves 56 are connected to the pipe 57 which is connected by pipes 58 and 59 to the brine tank 39. The return main is likewise provided with vertically extending pipes 60 provided with valves 61 and connected to a pipe 62 which is connected by pipes 63 and 64 to the brine tank 39.

These air lines are run from the mains with a slight rise to the brine tank and are connected to the highest points of the first fittings or elbows 25 in the compensating or swing joints 23 and with the elbows 23′ of the compensating or swing joints 34.

In using the device the valve 27 is left wide open and the valve 56 is left slightly open, while a valve 27′ of the compensating joint 34 is partly closed and the air valve 61 is left wide open. This is to ensure the circulation of the brine through the headers and pipes 17 and mains 22 and 35. The brine in the tank 39 may be cooled by compression or absorption or any other refrigerating system but as shown it is cooled by a compression system embodying a coil 66, a compressor pump 67 which forces ammonia gas through the pipe 68 into the ammonia condenser 69. The ammonia liquid is forced from the condenser through pipe 70 into the ammonia storage tank 71, through pipes 72 from the storage tank to the ammonia receiver 73. From the ammonia receiver 73 the pressure is reduced by valve 73′ and the ammonia is released into pipe 74 and thence passes through pipes 75 and 75′ into the brine cooler 50 and through pipe 76 into the ammonia coil 66 in the brine tank. At this point the brine is cooled. The ammonia gas is then drawn by the suction of the compressor 67 through pipes 77, 78, 79 and 80 from the coil 66 and the brine cooler 50, the suction line being controlled by valves 50′ and 66′.

When it is desired to melt the ice this is done by raising the temperature of the brine to heat the floor. The brine in the brine tank is heated in the following manner: Valve 84 on the gas line from the compressor is closed as well as valve 50′ on the suction line from the brine cooler. The compressor is operated and the hot gas is by-passed through valve 85 into pipes 81 and 82 directly into the bottom of the ammonia coil 66 which is immersed in the brine tank 39, the hot gas in the ammonia coil warming the brine. The hot gas is then drawn back by the suction of the compressor 67 through the valve 66′, pipes 77, 78, 79 and 80, which complete the circuit.

Figure 3:
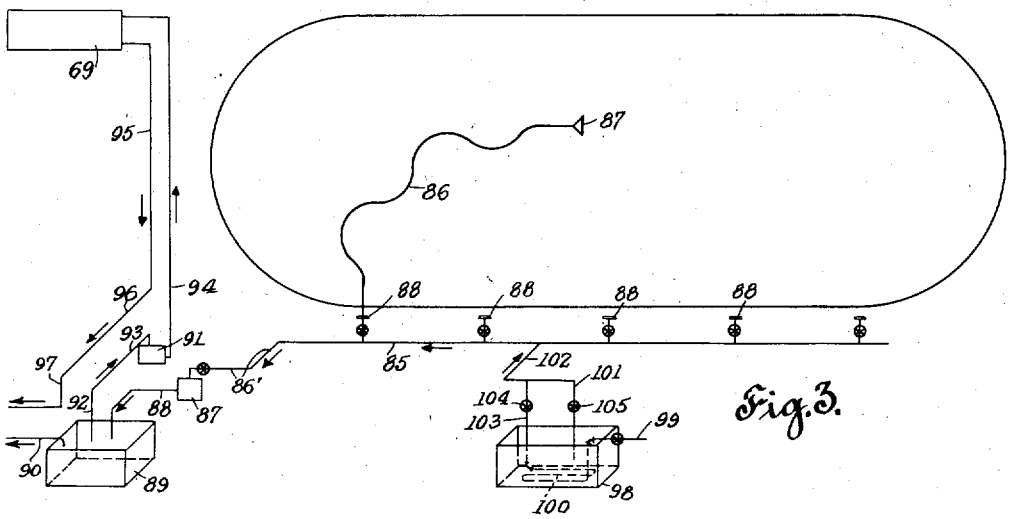
Figure 3 is a diagrammatic view partly in perspective, illustrating the piping and devices for removing the ice scrapings or melted ice from the floor of the skating rink.

In order to remove the water from the floor of the rink, a hose 86 is employed which is provided with a suction nozzle 87 and may be connected to any one of the hose connections 88, see Figure 3. These hose connections are connected to a pipe 85 which is connected by pipes 86′ to a vacuum pump 87 and the vacuum pump is connected by pipes 88 to a sump 89 which in turn is connected to an overflow pipe 90 which leads to the sewer, or if desired, the water in the sump 89 may be pumped by a circulating pump 91 through pipes 92, 93 and 94 to the condenser 69 and the condenser 69 be connected by pipes 95, 96 and 97 to the sewer. A snow melting tank 98 is provided to melt the snow or scrapings of the ice caused by the skaters and this tank is heated by steam entering through a pipe 99 and passing through a coil 100 located in the tank 98.

When the snow is melted the tank 98 is drained by the suction pipes 101, 102, 85, 86′ and vacuum pump 87. The pipe 103 leads from the outlet end of the steam coil to the suction pipe 102, so that when it is desired to assist in the circulation of steam through the coil 100 the valve 104 is opened and the valve 105 is closed and when it is desired to empty the tank of melted snow the valve 104 is closed and the valve 105 is opened.

The general operation of the apparatus hereinbefore described is as follows: The brine is supplied to the brine supply main 22 by pumps 41 which suck the brine from the tank 39 and force it through the connections hereinbefore named to the brine supply main 22 and from the brine supply main the brine passes through the headers 18 and through the pipes 17 to the headers 19 and thence through the compensating joints 34 to the return brine main 35 and thence into the brine tank. Meantime, the brine in the tank is cooled by the ammonia coil 66 and brine cooler 50 as hereinbefore described. If it is desired to melt the ice, the valves 84 and 50′ are closed and the hot gas is then circulated through the ammonia coils in the brine tank and the brine is heated to melt and loosen the ice on the floor and to heat the room in which the floor is located.

In the embodiment of the invention illustrated, the floor pipes extend transversely of the rink floor and this floor is divided transversely into sections or slabs which are reinforced throughout their longitudinal extent by the pipes embedded therein. This reinforcement strengthens the slabs and permits longitudinal expansion and contraction of the same while the joints between the slabs allow for contraction and expansion of the floor in the opposite direction. In this way breaking up of the floor from the severe and unusual temperature changes to which it is subjected is prevented and in case any repairs to the floor or embedded pipes become necessary, one slab can be repaired or taken up without affecting any other section of the floor.

The mounting of the floor slabs on the sand and cork supports, cushions the slabs, provides the effect of a "floating" support, enabling the slabs to have independent movement and also affords thermal insulation, preventing waste of the cooling or heating energy. The ends of the pipes are exposed at both ends of each slab and carry the shoulders which thus become unitary parts of the slabs and movable freely with the slabs because of the flexible swing joints between the headers and the mains. These units are made further independent of each other by the valves in the connections between the headers and mains which enable any one slab unit to be shut off without affecting others. The location of these connections over the headers and mains places these valves so that they may be conveniently reached and enables the placing of the mains in relatively shallow trenches closely adjacent and practically directly opposite the headers. The connections, therefore, need be no longer than is necessary for the desired flexibility, the arrangement is relatively compact and the cost of installation is kept within reasonable limits.

Couplings may be provided between the ends of the individual pipes and the headers to which they are connected, as indicated at 106 in Figure 4 to enable ready removal of the headers or the disconnection of individual pipes. Thus, if one or more pipes of a unit should be found to be leaking, the same may be disconnected, the headers closed off at such points and the balance of the unit be kept in operation.

The structure illustrated discloses a practical commercial embodiment of the invention, but it should be understood that various modifications and changes may be made, particularly to suit different special requirements, without departure from the broad spirit and scope of the following claims.

What is claimed is:

1. A floor of concrete or the like and means for varying the temperature thereof comprising a series of sections, expansion joints of elastic material separating said sections one from the other, a plurality of pipes embedded in each of said sections extending longitudinally thereof and approximately parallel to said expansion joints and arranged in a series of units, a pair of headers on opposite sides of said floor connecting the ends of the pipes of each unit together and means to cause a circulation of fluid through said pipes and headers.

2. A floor of concrete or the like and means for varying the temperature thereof comprising a series of sections, expansion joints of elastic material separating said sections one from the other, a plurality of pipes embedded in each of said sections extending longitudinally thereof and arranged in a series of units, a pair of headers on opposite sides of said floor connecting the ends of the pipes of each unit together, a supply main and means to connect said main to one of said headers, a return main and means to connect said return main to the other of said headers and means to cause a circulation of fluid through said mains, headers and pipes.

3. A floor of concrete or the like and means for varying the temperature thereof comprising a series of sections, expansion joints of elastic material separating said sections one from the other, a plurality of pipes embedded in each of said sections extending longitudinally thereof and arranged in a series of units, a pair of headers on opposite sides of said floor connecting the ends of the pipes of each unit together, a supply main, a return main, means to connect said supply main to one of said headers, said means constituting a compensating joint, and means to connect the other of said headers to said return main also constituting a compensating joint and means to cause a circulation of fluid through said mains, headers, pipes and expansion joints.

4. A floor of concrete or the like and means for varying the temperature thereof comprising a series of sections, expansion joints of elastic material separating said sections one from the other, a plurality of pipes embedded in each of said sections extending longitudinally thereof and approximately parallel to said expansion joints and arranged in a series of units, a pair of headers on opposite sides of said floor connecting the ends of the pipes of each unit together, and means to cause a circulation of fluid through said pipes and headers and an air exhaust system connected to said fluid circulating means whereby air may be removed from said pipes.

5. In a structure of the character disclosed, a floor constructed in separate slab sections supported for independent contracting and expanding movements, circulating pipes embedded in said slabs, a header at each end of each slab connected with the ends of the pipes embedded therein and thereby forming an integral part of such independent slab unit, supply and return mains adjacent the headers but positioned clear of said slab units so as not to interfere with the action of said independent units and yieldable connections between the headers and mains.

6. In a structure of the character disclosed, a floor constructed in separate slab sections supported for independent contracting and expanding movements, circulating pipes embedded in said slabs, a header at each end of each slab connected with the ends of the pipes embedded therein and thereby forming an integral part of such independent slab unit, supply and return mains adjacent the headers and connections between the headers and mains extending over the tops of the headers and mains and provided with valve means therein.

7. In a structure of the character disclosed, a floor constructed in separate slab sections supported for independent contracting and expanding movements, circulating pipes embedded in said slabs, a header at each end of each slab connected with the ends of the pipes embedded therein and thereby forming an integral part of such independent slab unit, supply and return mains adjacent and substantially opposite the headers and connections extending from the tops of the headers into the tops of the mains.

8. In a structure of the character disclosed, a floor constructed in separate slab sections supported for independent contracting and expanding movements, circulating pipes embedded in said slabs, a header at each end of each slab connected with the ends of the pipes embedded therein and thereby forming an integral part of such independent slab unit, supply and return mains adjacent the headers, connections extending from the headers to the mains and having portions located above said mains and air exhausting connections extending from the highest points of said header connections.

9. In a structure of the character disclosed, a floor constructed in separate slab sections supported for independent contracting and expanding movements, circulating pipes embedded in said slabs, a header at each end of each slab connected with the ends of the pipes embedded therein and thereby forming an integral part of such independent slab unit, supply and return mains adjacent the headers, connections extending from the headers to the mains and having portions located above said mains, air exhausting connections extending from the highest points of said header connections and regulatable valve means in said air exhausting connections.

10. In a structure of the character disclosed, a floor constructed in separate slab sections supported for independent contracting and expanding movements, circulating pipes embedded in said slabs, a header at each end of each slab connected with the ends of the pipes embedded therein and thereby forming an integral part of such independent slab unit, supply and return mains connected with said headers, means for circulating a heat transferring medium through said mains and means for cooling or for heating said transferring medium at will.

11. A floor adapted for use at different times for general utility or for skating rink purposes and comprising in combination with a supporting structure, a floor structure in separate slab sections having a top wearing surface forming the floor, said slab floor being mounted upon the supporting structure but separated therefrom by separating material enabling independent movement of the slab floor on the supporting structure and including thermal insulation for preventing loss of thermal energy into the supporting structure, circulating pipes embedded in each floor slab below the wearing surface of the same, supply and return mains adjacent the floor slabs, connections between the floor pipes and said mains enabling independent movement of said floor slabs and means for circulating a heat transferring medium through said mains and floor pipes.

12. A floor adapted for use at different times for general utility or for skating rink purposes and comprising in combination with a supporting structure, a floor structure in separate slab sections having a top wearing surface forming the floor, said slab floor being mounted upon the supporting structure but separated therefrom by separating material enabling independent movement of the slab floor on the supporting structure and including thermal insulation for preventing loss of thermal energy into the supporting structure, circulating pipes embedded in each floor slab below the wearing surface of the same, supply and return mains adjacent the floor slabs, connections between the floor pipes and said mains enabling independent movement of said floor slabs, means for circulating a heat transferring medium through said mains and floor pipes and means selectively operable for cooling or for heating said transferring medium and thus to chill the floor for freezing water thereon or to warm the floor to break the bond between the floor and the ice frozen thereon.

13. In combination with a supporting bed, separating material on said bed, flooring on said separating material and consisting of independently movable slab sections, circulating pipes embedded in and extending through said slab sections from one side to the opposite side of the flooring and means for circulating a refrigerant through said pipes, including flexible connections permitting the independent slab movements.

14. In combination with a supporting bed, separating material on said bed, flooring on said separating material and consisting of independently movable slab sections, circulating pipes embedded in and extending through said slab sections from one side to the opposite side of the flooring and means for circulating a refrigerant through said pipes, including flexible connections permitting the independent slab movements, the separating material between the bed and floor slabs including thermal insulation for preventing loss of cooling energy into the supporting bed.

15. In combination with a supporting bed, separating material on said bed, flooring on said separating material and consisting of independently movable slab sections, circulating pipes embedded in and extending through said slab sections from one side to the opposite side of the flooring and means for circulating a refrigerant through said pipes, including flexible connections permitting the independent slab movements, the separating material comprising cork and dry sand for insulating the floor slabs and enabling independent movement of the same.

16. In combination, a skating floor, refrigerant pipes embedded therein, a circulating system connected with said pipes, an air exhaust system connected with said circulating system for removing air from the circulating system, a suction system and suction operated snow removing means connectable with said suction system.

17. In combination, a skating floor, refrigerant pipes embedded therein, a circulating system connected with said pipes, an air exhaust system connected with said circulating system for removing air from the circulating system, a snow melter, a suction system and controllable suction connections from said snow melter to said suction system.

18. In combination with a supporting bed, thermal insulating and separating material on said bed, flooring resting on said separating material and thereby thermally insulated from and supported for independent expanding and contracting movement on said bed, said flooring having an upper wearing surface suitable for general floor purposes, circulating pipes embedded in said flooring below said wearing surface, said floor pipes having their ends exposed at the edge of said independently movable floor, supply and return mains adjacent said exposed ends of the floor pipes, connections between the ends of the floor pipes and the supply and return mains enabling independent movement of the floor and pipes embedded therein, means for circulating a heat transferring medium through the mains and embedded pipes and means selectively operable for cooling or for heating said transferring medium to chill the floor for freezing ice thereon or to warm the floor for breaking the bond between the wearing surface of the floor and the ice frozen thereon.

19. In combination, a skating floor, refrigerant circulating pipes embedded therein, curbing at the edges of said floor, headers connected with the circulating pipes outside the curbing, supply and return mains located beyond the headers and pipe connections from the headers to the mains, including sections above and substantially parallel to the mains.

20. A floor adapted for use at different times for general utility or for skating rink purposes and comprising a floor structure in separate slab sections supported for independent contracting and expanding movements, circulating pipes embedded in said slabs, supply and return mains at the ends of said embedded pipes, connections between the mains and pipes yieldable to allow for the independent movements of the floor slabs, means for circulating a heat transferring medium through the mains and embedded pipes and means selectively operable for cooling or for heating said transferring medium for either freezing water on the floor or for breaking the bond between the floor slabs and ice frozen on the floor.

In testimony whereof, I affix my signature.

GEORGE C. FUNK.